United States Patent

Smith

Patent Number: 4,467,605
Date of Patent: Aug. 28, 1984

[54] HYDRO-PNEUMATIC ACTUATOR WITH AUTOMATIC SLACK ADJUSTER

[75] Inventor: Eric Smith, Burlington, Canada
[73] Assignee: WABCO Ltd., Hamilton, Canada
[21] Appl. No.: 425,026
[22] Filed: Sep. 27, 1982
[51] Int. Cl.$^3$ .............................................. F15B 7/04
[52] U.S. Cl. ...................................... 60/577; 60/578; 60/586; 60/589; 60/592; 60/593; 92/13.1; 92/60.5; 188/153 R; 188/196 A; 188/347; 188/348
[58] Field of Search ................. 60/574, 576, 577, 578, 60/592, 589, 593, 585, 586; 92/13.1, 60.5; 188/153 R, 347, 348, 196 A

[56] References Cited

U.S. PATENT DOCUMENTS

| | | | |
|---|---|---|---|
| 2,106,304 | 1/1938 | McGee | 188/347 |
| 2,311,787 | 2/1943 | Swift | 60/578 |
| 2,917,900 | 12/1959 | Kirk | 60/577 |
| 3,191,384 | 6/1965 | Krusemark | 188/347 |
| 4,208,881 | 6/1980 | Brademeyer et al. | 60/592 |
| 4,288,987 | 9/1981 | Grüllmeier | 60/593 |

Primary Examiner—Robert E. Garrett
Assistant Examiner—Scott L. Moritz
Attorney, Agent, or Firm—Gary J. Falce

[57] ABSTRACT

A two-stage, hydro-pneumatic actuator suitable for use as a railway vehicle brake. The hydraulic cylinder comprises a large diameter bore in which a low- and a high-pressure piston operate jointly during a first stage of operation to effect a high volumetric displacement of hydraulic fluid via a small diameter bore in order to take up the clearance between the brake shoes and wheel. As the brake shoes contact the wheel, the high-pressure piston enters the small bore to interrupt further displacement of hydraulic fluid from the large bore. The force of the high-pressure piston alone during this second stage of operation produces the required brake forces with a high multiplication factor. Make-up fluid is drawn into a chamber on the backside of the low-pressure piston during a brake application stroke an amount corresponding to the over-travel of the high-pressure piston and is subsequently discharged into the hydraulic cylinder during retraction of the brakes to compensate for brake shoe wear. Following brake shoe replacement, a pressure relief valve back dumps excess hydraulic fluid from the large diameter bore to the reservoir when the brake shoes engage the wheels prior to the high-pressure piston entering the small diameter bore.

9 Claims, 2 Drawing Figures

HYDRO-PNEUMATIC ACTUATOR WITH AUTOMATIC SLACK ADJUSTER

BACKGROUND OF THE INVENTION

The present invention is related to hydro-pneumatic type brake actuators and more particularly to brake actuators of the above type, which are suitable for use in freight-type railway brake systems.

At the present time, railroads typically employ traditional automatic air brake systems. Each car in a train is normally equipped with auxiliary and emergency reservoirs which are charged from a brake pipe extending through the train, and a control valve which responds to changes in the brake pipe pressure to control the flow of air to and from the car brake cylinders. Since the railroad industry has standardized on relatively low braking pressures, and practical considerations limit the diameter of the car brake cylinders, it has become necessary to employ force-multiplying linkages between the brake cylinder and brake shoes in order to obtain the high braking forces required at the brake shoes. Such a brake rigging arrangement inherently increases the stroke of the brake cylinder piston required to move the brake shoes enough to take up the clearance space between the brake shoes and wheel treads. Accordingly, the brake cylinder clearance volume or, in other words, the piston stroke required to bring the shoes into wheel contact, must be relatively large and thus requires a considerable amount of air. This, in turn, requires relatively large air reservoirs, which are space-consuming and thus impose a further restriction on the area needed for the force-multiplying brake rigging.

The gradual acceptance of hydraulic brake systems in the rapid transit segment of the railway industry suggests the possibility of using hydraulics as a means of transmitting brake forces to the brake shoes in freight-type service. Such an approach would be advantageous in eliminating the need for the cumbersome, mechanical brake rigging presently employed on freight cars to transmit the brake cylinder forces to the brake shoes. Ideally, such an arrangement would require only a single hydro-pneumatic actuator device on each car corresponding to the brake cylinder in a conventional mechanical brake rigging system. Mechanical advantage sufficient to obtain the desired high brake shoe forces would be obtained by a large ratio piston of the hydraulic actuator. Because of this high ratio piston and the brake shoe clearance to be taken up, the stroke of the actuator piston in the hydraulic actuator would be necessarily large, and thus require a considerable amount of air simply to bring the brake shoes into braking engagement with the wheel treads. This would unduly enlarge the size of the hydraulic actuator, as well as require relatively large air reservoirs.

SUMMARY OF THE INVENTION

The object of the present invention is to provide a compact, low-cost, yet highly reliable hydro-pneumatic brake actuator device having a high ratio input-to-output hydraulic pressure developed in two stages, in order to reduce the piston stroke required to take up the clearance between the brake shoes and wheel treads of a railway vehicle.

Another object of the invention is to provide a hydro-pneumatic actuator of the above type, which automatically compensates for variations in the clearance between the brake shoes and wheel treads due to brake shoe wear or replacement, so that the transition between the low and high ratio output stages is correlated with brake shoe/wheel engagement.

Briefly, the hydro-pneumatic actuator according to the present invention converts an input force, such as the pneumatic output of an air brake control valve device, into a proportionally higher hydraulic pressure. During the first stage of operation, a pneumatic piston drives a high-pressure hydraulic piston having a low-pressure hydraulic piston slidably mounted on it. The high- and low-pressure pistons are arranged so that actuation of the high-pressure piston by the pneumatic piston causes joint operation of the low-pressure piston, which has sealing engagement with a large diameter bore. Accordingly, a relatively large volumetric displacement of hydraulic fluid is realized via a small diameter bore having an outlet. Displacement of hydraulic fluid during this first stage of operation is terminated by engagement of the high-pressure piston with a seal in the small diameter bore, and is designed to occur at the same time as the brake shoe clearance is taken up, so that substantially no piston travel occurs during the subsequent power stroke of the high-pressure piston.

Overtravel of the high-pressure piston due to brake shoe wear is compensated for by a displacement cylinder, which draws make-up fluid from the reservoir, an amount corresponding to the piston overtravel. This fluid is drawn into a chamber on the back side of the low-pressure piston during the actuation stroke and is forced into the hydraulic cylinder during the release stroke.

In the event of undertravel, high pressure is developed at the face of the low-pressure piston, due to brake shoe/wheel engagement occurring prior to the high-pressure piston engaging its seal in the small diameter bore. This high-pressure fluid is forced to flow back to the reservoir via a pressure relief check valve until the high-pressure piston travel is sufficient to effect seal engagement in the small diameter bore.

BRIEF DESCRIPTION OF THE DRAWING

The foregoing objects and further advantages of the invention will become apparent from the following more detailed explanation when taken with the drawing in which.

DESCRIPTION AND OPERATION

Figure 1:
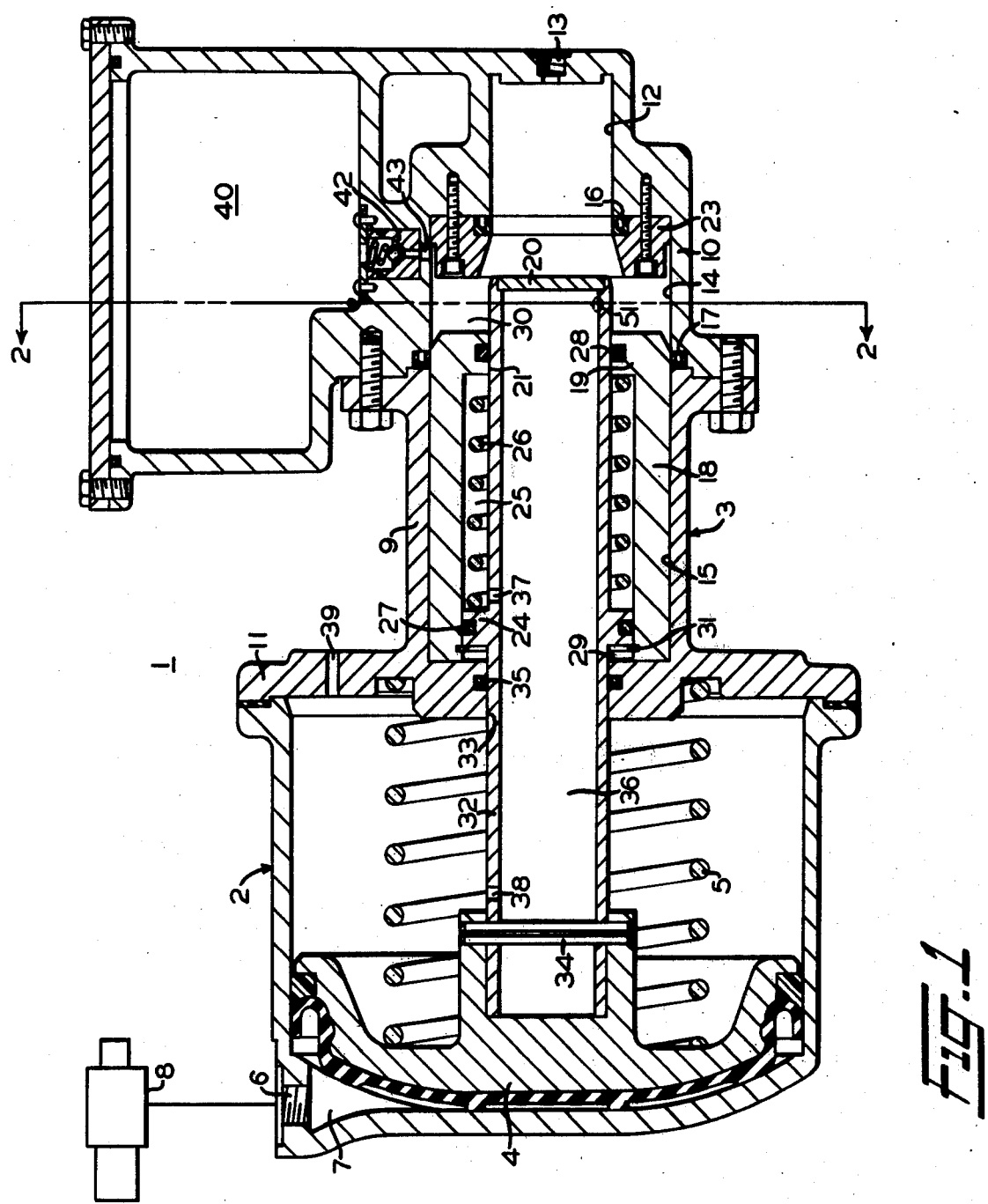
FIG. 1 is an elevational section view showing the hydro-pneumatic actuators device of the invention in assembly.

The hydro-pneumatic brake actuator 1 comprises a pneumatic cylinder 2 and a hydraulic cylinder 3. A pneumatic piston 4 is operably disposed in pneumatic cylinder 2 and is provided with a return spring 5 that urges the pneumatic piston toward its release position, as shown. An inlet port 6 is provided to admit air to the actuating chamber 7 formed between pneumatic piston 4 and the pneumatic cylinder. The air supplied to actuating chamber 6 may be controlled, for example, by a conventional, well-known AB, ABD, or ABDW type air brake control valve device 8.

Hydraulic cylinder 3 comprises a pair of cylindrical portions 9 and 10, each having a closed end and an open end. An external annular flange 11 of cylindrical portion 9 is bolted to the non-pressure side of pneumatic cylinder 2. Cylindrical portion 10 is provided with a bore 12 having an outlet 13 and a counterbore 14. The open end of cylindrical portions 9 and 10 are bolted together so that the larger diameter counterbore 14 of portion 10 is coaxial with a correspondingly sized bore 15 in portion 9. Each bore 12 and 14 is provided with a respective pressure seal 16 and 17. Disposed in bore 14-15 of hydraulic cylinder 3 is a low-pressure hydraulic piston 18 formed in the shape of a sleeve having an inturned flange 19. A high-pressure hydraulic piston 20 is slidably disposed within low-pressure piston 18, such that its active end projects through an opening 21 in the inturned flange 19 of piston 18. The outer diameter of high-pressure piston 20 corresponds to the diameter of bore 12, which contains a seal retainer 23 that supports seal 16 in place for engagement by piston 20 upon movement of piston 20 for a predetermined distance in a brake application direction, as will be hereinafter discussed in detail.

High-pressure piston 20 is formed with an outturned flange 24 that is axially spaced from inturned flange 19 of piston 18, so as to form an annular cavity 25 between the low- and high-pressure pistons in which a spring 26 is contained. A seal ring 27 in flange 24 engages the inner sleeve surface of high-pressure piston 18, and a seal ring 28 in flange 19 engages the outer surface of piston 20 to seal annular cavity 25 from the respective chambers 29 and 30, formed on the opposite sides of pistons 18 and 20. A retainer ring 31 in low-pressure piston 18 provides a stop against which out-turned flange 24 of high-pressure piston 20 rests in order to cage spring 26.

A push rod 32 integral with high-pressure piston 20 projects through an annular opening 33 in the closed end of cylindrical portion 9, and is connected to pneumatic piston 4 by a roll pin 34. A seal 35 in opening 33 engages push rod 32 to seal the non-pressure end of pneumatic cylinder 2 from chamber 29 formed between the closed end of cylindrical portion 9 and the respective low- and high-pressure pistons 18 and 20.

Push rod 32 and high-pressure piston 20 are tubular in shape so as to form a continuous hollow 36 therein. A radial passage 37 in piston 20 and a radial passage 38 in push rod 32 vent the annular cavity 25 to the non-pressure end of pneumatic cylinder 2 via the hollow 36. A vent plug 39 connects the non-pressure end of pneumatic cylinder 2 to atmosphere.

Figure 2:
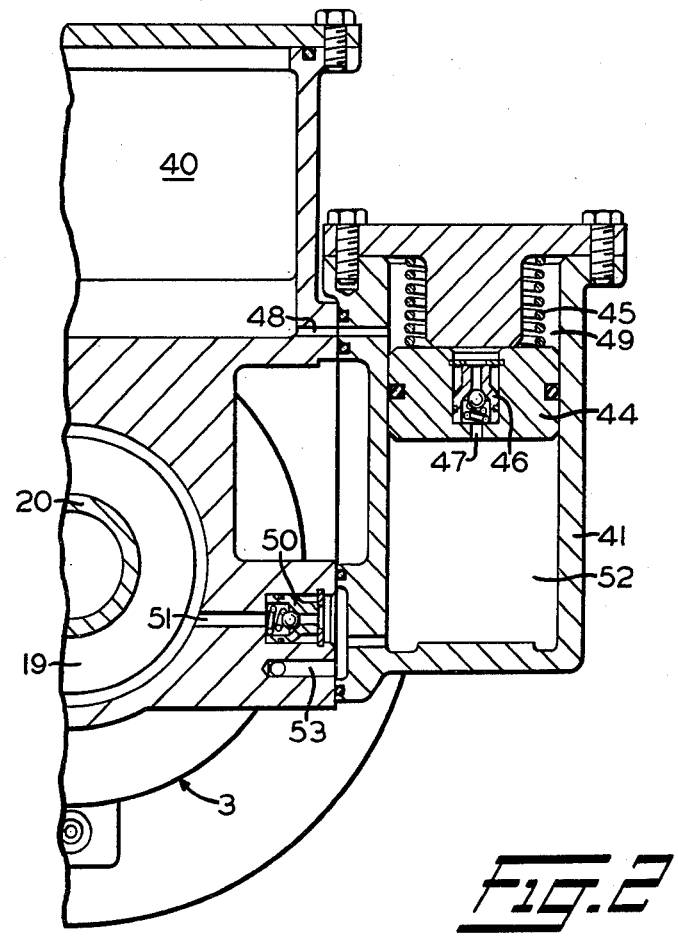
FIG. 2 is a partial sectional view taken along the line 2—2 of FIG. 1 showing the relationship between the hydraulic cylinder and a displacement cylinder.

Cylindrical portion 10 further comprises a hydraulic reservoir 40 and a displacement cylinder 41 (FIG. 2). A pressure relief check valve 42 is provided in a passage 43 between reservoir 40 and chamber 30 within the area of counterbore 14.

Displacement cylinder 41 is provided with a displacement piston 44 having a spring 45 acting on one side and a one-way check valve 46 in a passage 47 extending through piston 44. A passage 48 is connected between reservoir 40 and a chamber 49 on the spring side of piston 44 while a one-way check valve 50 is provided in a passage 51 that is connected between chamber 30 within the area of counterbore 14 and a chamber 52 on the side of displacement piston 44 opposite spring 45. A branch passage 53 of passage 51 connects chamber 52 to chamber 29.

In an air brake controlled, hydraulic brake system for freight cars, the hydro-pneumatic actuator device 1 of the present invention responds to the air pressure from the air brake control valve device 8. This pressure is supplied to chamber 7 and actuates pneumatic piston 4 in a rightward direction against the force of return spring 5. Alternatively, pneumatic piston 4 may be actuated mechanically, as by engagement with a push rod of a pneumatically-operated actuator or the like. During the first stage of operation, high-pressure hydraulic piston 20, which is driven by pneumatic piston 4, moves rightwardly in cylinder 3, and carries spring 26 with it. Low-pressure piston 18 is consequently driven rightwardly in cylinder 3 along with high-pressure piston 20 by the intermediary effect of spring 26. In that both pistons 18 and 20 are concurrently effective to displace hydraulic fluid in chamber 30 of cylinder 3 during this first stage of operation, a relatively large volume of fluid is forced to flow from outlet 13. This hydraulic fluid may be utilized to operate small brake actuators, in order to take up the brake shoe clearance, until such time as high-pressure piston 20 engages seal 16. The volumetric displacement of fluid during this first stage of operation is determined by the distance through which the brake shoes must move to engage the wheel treads for braking and by the size of the pistons in the brake actuators that are operated by means of the hydraulic fluid pressure provided by actuator device 1. It should be understood, at this point, that, during movement of pistons 18 and 20 throughout this first stage of operation, insufficient hydraulic fluid pressure is developed in chamber 30 to overcome the bias spring of pressure relief check valve 42, since the force required to move the vehicle brake shoes into braking engagement is relatively low.

Once high-pressure piston 20 engages seal 16, further volumetric displacement of fluid from chamber 30 is terminated and, therefore, high-pressure piston 20 alone, acting on the hydraulic fluid in small bore 12, is effective during a second stage of operation to generate the fluid force at output 13 with a higher input/output force multiplication ratio than during the first stage of operation.

Since virtually no further hydraulic fluid displacement actually occurs during the second stage of operation, due to brake shoe/wheel engagement, it will be appreciated that the pneumatic piston stroke is complete and thus the higher force multiplication in effect at this point is of no consequence insofar as affecting this pneumatic piston stroke and thus air requirement. The two-stage operation affords the necessary force multiplication to produce the desired brake shoe forces without the accompanying adverse effect (high air consumption) of a long piston stroke and large piston volume found in single stage actuator devices that are required to produce high ratio input/output forces.

In order to maintain proper brake shoe/wheel clearance and thereby assure a piston stroke that establishes a constant transition point between the first and second stage operations, an automatic, double-acting slack adjuster arrangement is provided, which compensates for overtravel of pneumatic piston 4, due to brake shoe/wheel wear and undertravel due to the replacement of worn brake shoes with new brake shoes.

During the aforementioned brake application stroke of pneumatic piston 4, the resultant rightward movement of low- and high-pressure pistons 18 and 20 creates a sub-atmospheric pressure in chamber 29. Accordingly, hydraulic fluid in chamber 52 of displacement cylinder 41 is drawn by suction into chamber 29, thereby creating a sub-atmospheric pressure area under displacement piston 44, which is thus forced by spring 45 in a downward direction a distance corresponding to the travel of pistons 18 and 20. The various piston diameters are selected such that displacement piston 44 bottoms out, by engagement with a stop provided by the casing at the bottom of the bore in which displacement piston 41 is operative, when high-pressure piston 20 engages seal 16.

In the event of brake shoe/wheel wear, high-pressure piston 20 is forced into bore 12 of hydraulic cylinder 3 following engagement with seal 16, in order to maintain brake shoe/wheel engagement. This results in a further volume expansion of chamber 29, which is supplied with make-up hydraulic fluid from reservoir 40 via passage 48, chamber 49, check valve 46, chamber 52, and branch passage 53.

When a brake release is subsequently made by releasing air from chamber 7 via control valve device 8, high-pressure piston 20 is forced leftwardly with pneumatic piston 4 under the action of return spring 5. Flange 24 of piston 20 engages retainer ring 31 to pull low-pressure piston 18 leftwardly also. This relieves the pressure in hydraulic chamber 30 and at outlet 13 to release the brakes, while concurrently forcing the hydraulic fluid drawn into chamber 29 during the preceding brake application back into displacement chamber 52. Because of the one-way action of check valve 46, this fluid is prevented from flowing through the check valve 46 to reservoir 40, and is thus effective to raise displacement piston 44 to its uppermost position. This fluid returned to displacement chamber 52 is attributed to the desired normal piston travel. Following the resetting of displacement piston 44, the remaining make-up fluid in chamber 29 corresponds to the overtravel of piston 20 and is forced into chamber 30 of hydraulic cylinder 3 via branch passage 53, check valve 50, and passage 51, as pistons 18 and 20 are fully retracted. In this manner, the additional make-up fluid corresponding to excess piston travel resulting from shoe/wheel wear is drawn into the active hydraulic system, so that brake shoe/wheel engagement will continue to occur at precisely the time when high-pressure piston 20 engages seal 16 to initiate the aforementioned second stage of operation.

When worn brake shoes require replacement, the maintained brake shoe/wheel clearance will be reduced by the difference between the new and worn shoe thickness. During a brake application, therefore, brake shoe/wheel engagement will occur prior to high-pressure piston 20 engaging seal 16. Consequently, pressure relief check valve 42 is subject to the high brake pressure developed in hydraulic cylinder 3 whereas, normally, chamber 30 is isolated from this high pressure by engagement of high-pressure piston 20 with seal 16. The hydraulic fluid in chamber 30 is thus forced into reservoir 40 via pressure relief check valve 42 until high-pressure piston 20 travels forward sufficiently to engage seal 16. This, in effect, reduces the active hydraulic fluid in the system an amount sufficient to correct undertravel of high-pressure piston 20 and, accordingly, correlate engagement of high-pressure piston 20 and seal 16 with brake shoe/wheel engagement. Upon a subsequent release of the brakes, the normal brake shoe clearance will be accordingly reestablished.

As long as this normal brake shoe clearance is maintained, the pressure of hydraulic fluid in chamber 30 will remain below a value sufficient to open pressure relief check valve 42 prior to the high pressure piston 20 engaging seal 16 during actuation thereof.

Having thus described the invention, what I claim as new and desire to secure by Letters Patent, is:

1. A fluid pressure actuator comprising:
   (a) a hydraulic cylinder having a large diameter bore, a small diameter bore opening into said large diameter bore, and an outlet in said small diameter bore;
   (b) a high-pressure piston operatively disposed in said large diameter bore and adapted to enter said small diameter bore;
   (c) first seal means in said small diameter bore for engagement with said high-pressure piston;
   (d) a low-pressure piston slidably mounted on said high-pressure piston for operation in said large diameter bore;
   (e) second seal means in said large diameter bore engageable with said low-pressure piston for providing first and second hydraulic chambers on the opposite sides of said low- and high-pressure pistons;
   (f) a reservoir in which hydraulic fluid is stored;
   (g) a displacement cylinder;
   (h) a displacement piston operable in said displacement cylinder between first and second positions, said displacement piston forming in cooperation therewith a third chamber on one side of said displacement piston and a fourth chamber on the other side;
   (i) a first passage between said reservoir and said third chamber via which hydraulic fluid is communicated therebetween;
   (j) a second passage between said second and fourth chambers via which hydraulic fluid is conducted in response to said joint movement of said high- and low-pressure pistons;
   (k) stop means for defining said second position of said displacement piston, said displacement piston being movable from said first position to said second position in response to the flow of said hydraulic fluid from said fourth chamber to said second chamber during said actuation of said high- and low- pressure pistons said predetermined distance;
   (l) a third passage between said third and fourth chambers via which make-up hydraulic fluid is drawn from said reservoir to said second chamber in response to actuation of said high-pressure piston a distance exceeding said predetermined distance following engagement of said displacement piston with said stop;
   (m) a first one-way check valve in said third passage;
   (n) a branch passage of said second passage leading to said first chamber; and
   (o) a second one-way check valve in said branch passage via which said make-up hydraulic fluid drawn into said second chamber is conducted to said first chamber upon retraction of said high- and low-pressure pistons.

2. A fluid pressure actuator as recited in claim 1, wherein the volumetric displacement of hydraulic fluid via said outlet during said first stage of operation is sufficient to establish said predetermined distance.

3. A fluid pressure actuator as recited in claim 1, further comprising a pneumatic piston connected to said high-pressure piston to effect said actuation thereof.

4. A fluid pressure actuator as recited in claim 1, wherein said means for effecting movement of said low-pressure piston jointly with said high-pressure piston comprises:

(a) a spring between an inturned flange of said low-pressure piston and an outturned flange of said high-pressure piston; and (b) a retainer ring secured in said low-pressure piston so as to engage said outturned flange of said high-pressure piston.

5. A fluid pressure actuator as recited in claim 1, further comprising a spring acting on said displacement piston in the direction of said stop.

6. A fluid pressure actuator as recited in claim 1, further comprising:

(a) a fourth passage between said reservoir and said first chamber; and (b) a pressure relief check valve in said fourth passage via which hydraulic fluid is conducted from said first chamber to said reservoir when the hydraulic fluid pressure in said first chamber exceeds a certain predetermined value during said actuation of said high-pressure piston prior to engagement thereof with said first seal means.

7. A fluid pressure actuator as recited in claim 1, wherein said third passage is in said displacement piston.

8. A fluid pressure actuator as recited in claim 1, wherein said first one-way check valve prevents flow of hydraulic fluid from said fourth chamber to said third chamber.

9. A fluid pressure actuator as recited in claim 1, wherein said second one-way check valve prevents flow of hydraulic fluid from said first chamber to said fourth chamber.

* * * * *